(12) United States Patent
Watanabe

(10) Patent No.: US 9,013,058 B2
(45) Date of Patent: Apr. 21, 2015

(54) VEHICLE LIGHTING DEVICE AND LIGHTING METHOD

(75) Inventor: Shinya Watanabe, Seto (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 1030 days.

(21) Appl. No.: 12/921,857

(22) PCT Filed: Mar. 2, 2009

(86) PCT No.: PCT/IB2009/000380
§ 371 (c)(1),
(2), (4) Date: Sep. 10, 2010

(87) PCT Pub. No.: WO2009/112910
PCT Pub. Date: Sep. 17, 2009

(65) Prior Publication Data
US 2011/0012511 A1   Jan. 20, 2011

(30) Foreign Application Priority Data
Mar. 12, 2008   (JP) .................................. 2008-062489

(51) Int. Cl.
*B60L 1/14* (2006.01)
*B60Q 1/02* (2006.01)
*B60Q 1/08* (2006.01)

(52) U.S. Cl.
CPC .......... *B60Q 1/085* (2013.01); *B60Q 2300/054* (2013.01); *B60Q 2300/056* (2013.01); *B60Q 2300/312* (2013.01); *B60Q 2300/42* (2013.01); *B60Q 2300/45* (2013.01)

(58) Field of Classification Search
CPC ............. B60Q 1/143; B60Q 2300/312; B60Q 2300/314; B60Q 2300/052; B60Q 1/1423
USPC ................ 307/10.1, 10.8; 362/464, 465, 466; 315/82; 382/104
See application file for complete search history.

(56) References Cited

U.S. PATENT DOCUMENTS

| 5,798,911 A * | 8/1998 | Josic .............................. 362/466 |
| 6,759,761 B1 * | 7/2004 | Schmitt et al. ............... 307/10.8 |

(Continued)

FOREIGN PATENT DOCUMENTS

| CN | 1602260 | 3/2005 |
| EP | 0 699 559 A2 | 3/1996 |

(Continued)

OTHER PUBLICATIONS

Machine english translation of Mori JP 2004175229A.*

(Continued)

*Primary Examiner* — Rexford Barnie
*Assistant Examiner* — Rasem Mourad
(74) *Attorney, Agent, or Firm* — Finnegan, Henderson, Farabow, Garrett & Dunner, LLP

(57) ABSTRACT

The light distribution region of headlights (12) is divided into a plurality of regions, and each of the divided regions can be irradiated or non-irradiated by light, and the light distribution characteristic can be changed separately for each divided region. The radiation or non-radiation of light to each divided region is controlled by a light distribution control ECU (14). Besides, light reflection/emission regions (hatched portions in FIG. 4) are detected by detecting light regions of reflection, such as white lines, reflectors, etc., and light regions of light emission, such as street lights or the like, are detected. Then, divided regions corresponding to light distribution region irradiated by the headlights (12) which correspond to the detected light reflection/emission regions are specifically determined, and the headlights (12) are controlled so that the light radiated to the specifically determined divided regions 22 becomes dark in light distribution relative to other regions.

29 Claims, 12 Drawing Sheets

(56) References Cited

U.S. PATENT DOCUMENTS

| | | | |
|---|---|---|---|
| 6,861,809 B2 * | 3/2005 | Stam | 315/82 |
| 7,744,261 B2 * | 6/2010 | Fukawa et al. | 362/543 |
| 2004/0218401 A1 * | 11/2004 | Okubo et al. | 362/526 |
| 2005/0152581 A1 * | 7/2005 | Hoki et al. | 382/104 |
| 2006/0038959 A1 | 2/2006 | Hull et al. | |
| 2006/0146552 A1 | 7/2006 | Shaffer | |
| 2006/0214617 A1 * | 9/2006 | Kimura et al. | 318/443 |
| 2008/0130302 A1 | 6/2008 | Watanabe | |
| 2008/0231195 A1 | 9/2008 | Kobayashi et al. | |

FOREIGN PATENT DOCUMENTS

| | | |
|---|---|---|
| EP | 1 780 462 | 5/2007 |
| GB | 2 395 390 | 5/2004 |
| JP | 2000-238576 | 9/2000 |
| JP | 2004175229 A  * | 6/2004 |
| JP | 2005-329819 | 12/2005 |
| JP | 2006-188224 | 7/2006 |
| JP | 2006-248246 | 9/2006 |
| JP | 2008-37240 | 2/2008 |
| JP | 2008-230364 | 10/2008 |
| WO | WO 03/053737 | 7/2003 |

OTHER PUBLICATIONS

Applicant cited Stam, Joseph (WO 03/053737 A1).*
Stam (WO 03/053737 A1).*
International Search Report dated May 25, 2009.*
International Search Report in International Application No. PCT/IB2009/000380; Mailing date: May 25, 2009.
Written Opinion of the International Searching Authority in International Application No. PCT/IB2009/000380; Mailing date: May 25, 2009.
European Office Action for EP Appl. No. 09 720 282.4-2423 dated Dec. 30, 2011.
Notification of the First Office Action for Chinese Appl. No. 200980108843.0 dated Aug. 3, 2012.
Notification of Reason(s) for Refusal for JP Appl. No. 2008-062489 dated Dec. 11, 2009.
International Search Report and Witten Opinion of the International Searching Authority for PCT/IB2009/000380 dated May 25, 2009.

* cited by examiner

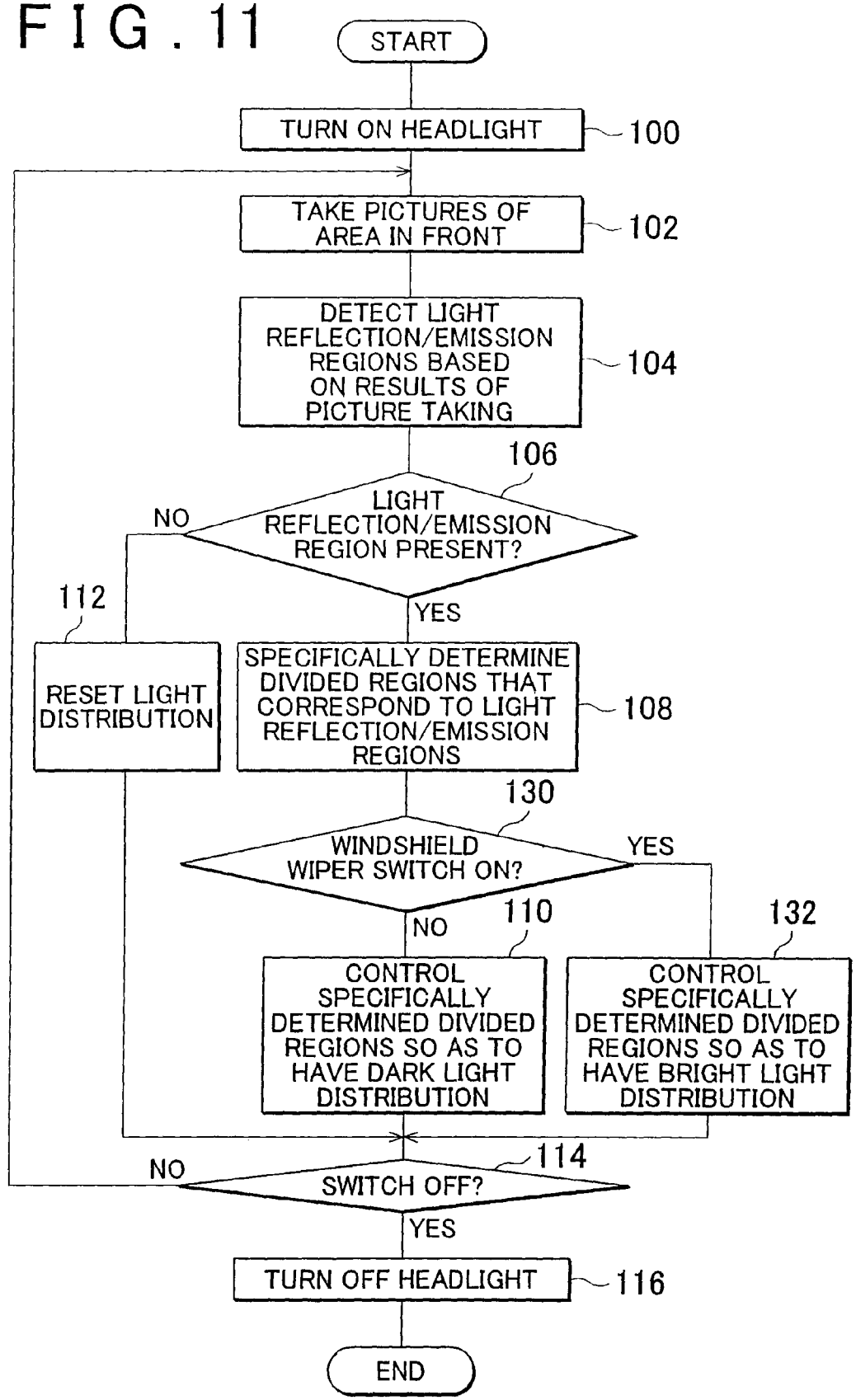

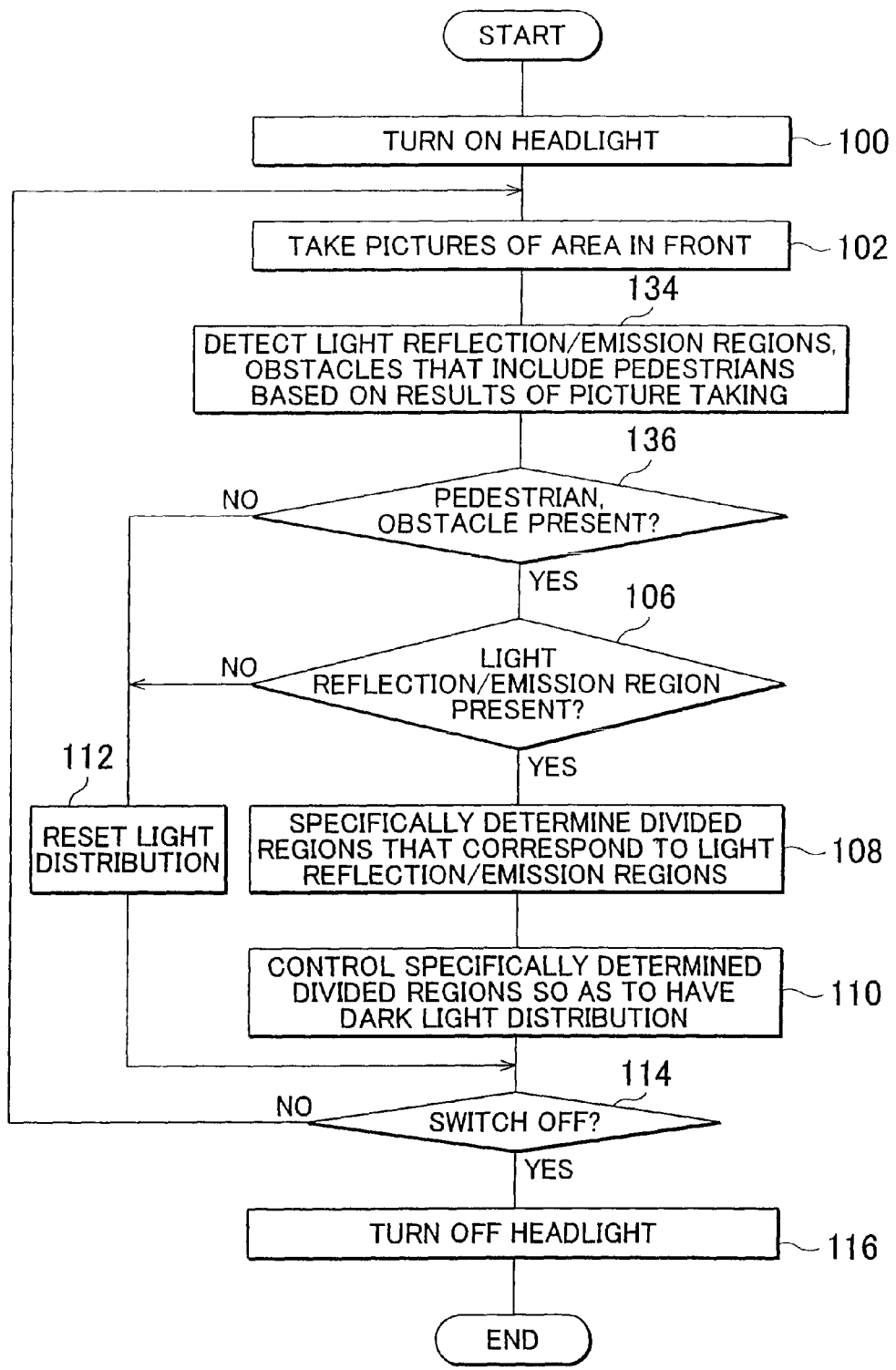

VEHICLE LIGHTING DEVICE AND LIGHTING METHOD

CROSS-REFERENCE TO RELATED APPLICATIONS

This application is a national phase application of International Application No. PCT/IB2009/000380, filed Mar. 2, 2009, and claims the priority of Japanese Application No. 2008-062489, filed Mar. 12, 2008, the contents of both of which are incorporated herein by reference.

BACKGROUND OF THE INVENTION

1. Field of the Invention

The invention relates to a lighting device and a lighting method for a vehicle. More particularly, the invention relates to a lighting device and a lighting method for a vehicle which control the light distribution of a headlight.

2. Description of the Related Art

Various related technologies of controlling the light distribution of a headlight of a vehicle in order to secure a forward visibility for the vehicle driver during nighttime travel.

For example, a technology described in Japanese Patent Application Publication No. 2006-248246 (JP-A-2006-248246) includes lighting range control means for controlling a range of lighting the road, and a lane mark sensing means for sensing a lane mark on the road. When the lane mark sensing means does not sense a lane mark, the technology performs a control of broadening the lighting range toward a region in which no lane mark is sensed. Thus, the lighting range is expanded toward a region in which no lane mark exists, and brighter lighting is provided for the region of high need for safety checking on a travel road ahead without a lane mark, such as an intersection, a branching road, a merging road, a curve, etc.

According to the foregoing technology described in Japanese Patent Application Publication No. 2006-248246 (JP-A-2006-248246), on a curve where no lane mark is sensed, or the like, the lighting range is expanded toward a region in which no lane mark is sensed, which can result in light being radiated to a lane mark that was not sensed. In the case where light is radiated to a lane mark such as a white line or the like, the white line, high in reflectance, stands out, so that the vehicle driver may sometimes misconceive that the entire field of view is visible despite insufficient visibility of sites other than the white line. In such a case, the vehicle driver, thinking that the visibility is good, may sometimes increase the vehicle speed. Thus, there is a room for betterment, from the viewpoint of safety and restraint of the vehicle speed.

SUMMARY OF THE INVENTION

The invention provides a vehicle lighting device and a vehicle lighting method of securing visibility when it is dark and prompting restraint of the vehicle speed on a dark occasion.

A first aspect of the invention relates to a vehicle lighting device includes: vehicle lighting means for changing a light distribution characteristic; detection means for detecting at least one light region that is at least one of a region that reflects light and a region that emits light on a road on which a vehicle travels; and control means for controlling the vehicle lighting means so that, in a light distribution region that is lighted from the vehicle lighting means, the light distribution to the at least one light region detected by the detection means becomes relatively darker than the light distribution to another region on the road.

According to the foregoing construction, the light regions of reflection or emission of light darkens relative to other regions. Therefore, a vehicle driver will not misconceive that the entire field of view is visible, restraint of the vehicle speed can be prompted. Besides, visibility can be secured with respect to other regions. Therefore, visibility when it is dark can be secured, and restraint of the vehicle speed can be prompted.

In the vehicle lighting device according to this aspect, the vehicle lighting means may change the light distribution characteristic separately for each of a plurality of divided regions of the light distribution region, and may also be provided in a front end portion of the vehicle. Besides, the light distribution characteristic may include at least one of direction of light distribution and amount of light distribution.

In the vehicle lighting device according to the foregoing aspect, the vehicle lighting means may have a spatial light modulation element, and the control means may control the vehicle lighting means by driving the spatial light modulation element. Furthermore, the spatial light modulation element may be a digital micromirror device that includes a plurality of micromirrors, and the control means may control the vehicle lighting means by rotating at least one of the plurality of micromirrors.

In the vehicle lighting device according to the foregoing aspect, the vehicle lighting means may have a plurality of light sources, and the control means may control the vehicle lighting means by changing the amount of light distribution of at least one of the plurality of light sources.

The vehicle lighting device according to the foregoing aspect may further include specific determination means for specifically determining the light region that is apart from the vehicle by at least a predetermined distance, among the at least one light region detected by the detection means, and the control means may control the lighting means so that the light region specifically determined by the specific determination means has a dark light distribution relative to another region. This construction will prevent a misconception that the entire field of view is visible, and will prompt restraint of the vehicle speed, and will secure a certain recognizability of light regions with regard to areas near the host vehicle.

Besides, in the vehicle lighting device according to the foregoing aspect, the specific determination means may specifically determine, as the light region apart from the vehicle by at least the predetermined distance, the light region that corresponds to a predetermined high-beam region in the light distribution region of the vehicle lighting means, and may also specifically determine, as the light region apart from the vehicle by at least the predetermined distance, the light region that corresponds to a region that is apart from the vehicle by at least a braking distance that is determined beforehand.

Besides, the vehicle lighting device according to the foregoing aspect may further include determination means for determining presence/absence of a travel impediment to the vehicle, and the control means may execute a control of the vehicle lighting means if it is determined by the determination means that the travel impediment is present. Due to this construction, since the light distribution control is performed according to the travel impediment characteristic, restraint of the vehicle speed will not be prompted more than necessary, and the achievement of both safety and comfort becomes possible. In the vehicle lighting device according to the foregoing aspect, the determination means may determine that the travel impediment is present, if at least one travel impediment that is at least one of a pedestrian and an obstacle is detected.

Besides, the vehicle lighting device according to the foregoing aspect may further include rain determination means for determining whether or not it is raining, and the control means may prohibit a control of the vehicle lighting means, if it is determined by the rain determination means that it is raining. According to the this construction, at the time of rain, the irregular reflection from the road surface increases, and therefore the visibility of a road surface shape or the like declines if there is a dark light distribution region. Therefore, by prohibiting the light distribution control during rain, visibility can be secured. Furthermore, the rain determination means may determine whether or not it is raining, based on state of operation of a windshield wiper of the vehicle.

Besides, in the vehicle lighting device according to the foregoing aspect, if it is determined by the rain determination means that it is raining, the control means controls the vehicle lighting means so that the light region detected by the detection means has a bright light distribution relative to another region on the road on which the vehicle travels. Due to the foregoing construction, visibility during rain can be secured, with priority given to the recognition of light regions, such as white lines, street lights, etc. during rain.

Besides, in the vehicle lighting device according to the invention, the detection means may detect a white line as the region that reflects light.

A second aspect of the invention relates to a lighting method. The lighting method includes: lighting an outside of a vehicle; detecting at least one light region that is at least one of a region that reflects light and a region that emits light on a road on which the vehicle travels; and causing light distribution to the at least one light region detected by the detection means in a light distribution region that is lighted to be relatively darker than the light distribution to another region on the road.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 11 is a flowchart showing an example of the light distribution control routine that is performed by a light distribution control ECU of the vehicle lighting device in accordance with a fourth embodiment of the invention; and FIG. 12 is a flowchart showing an example of the light distribution control routine that is performed by a light distribution control ECU 14 of a vehicle lighting device in accordance with a fifth embodiment of the invention.

DETAILED DESCRIPTION OF EMBODIMENTS

Hereinafter, examples of embodiments of the iv will be described with reference to the drawings.

Figure 1:
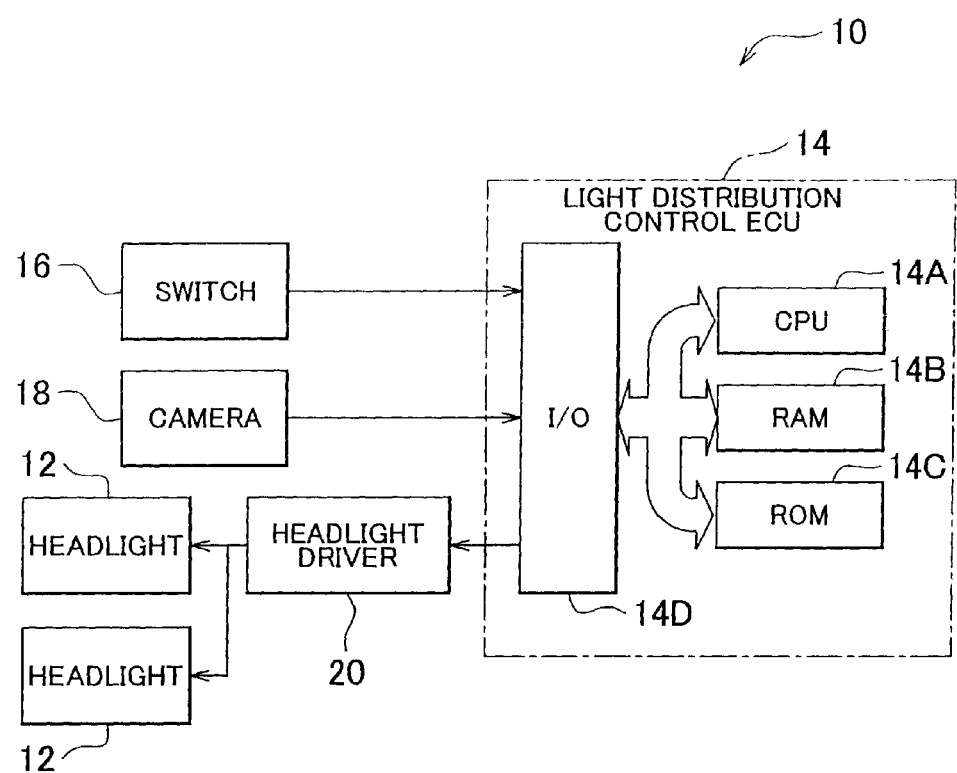
FIG. 1 is a block diagram showing a construction of a vehicle lighting device in accordance with a first embodiment of the invention.

FIG. 1 is a block diagram showing a construction of a vehicle lighting device in accordance with a first embodiment of the invention.

In a vehicle lighting device 10 shown in FIG. 1 in accordance with the first embodiment of the invention, headlights 12 (an example of vehicle lighting means in the invention) provided in a vehicle are connected to a light distribution control ECU 14 (an example of control means in the invention), so that the turning on and off of the headlights 12 is controlled by the light distribution control ECU 14.

In this embodiment, the light distribution control ECU 14 controls the light distribution so that in a light distribution region irradiated by the headlights 12, at least one of a light region on a traveling road which reflects light and a light region on a traveling road which emits light has a relatively dark light distribution relative to regions other than the light-reflecting region and the light-emitting region on the traveling road. In addition, concrete contents of the light distribution control will be described later.

The light distribution control ECU 14 is constructed of a microcomputer that includes a CPU 14A, a RAM 14B, a ROM 14C, and an I/O 14D.

The ROM 14C of the light distribution control ECU 14 stores tables for performing the light distribution control of the headlights 12, programs for executing a light distribution control routine described later, etc. The RAM 14B is used as, for example, a memory when the CPU 14A performs various computations and the like.

The I/O 14D is connected to a switch 16, a camera 18 (an example of detection means in the invention), and a headlight driver 20. The state of operation of the switch 16, and results of the camera taking pictures of areas in front of the vehicle are input to the light distribution control ECU 14.

The switch 16 commands the turning on and off of the headlights 12, and commands low beam and high beam thereof, and outputs a result of command to the light distribution control ECU 14. Besides, the camera 18 takes pictures of areas in front of the vehicle, and outputs results of the picture taking to the light distribution control ECU 14.

The light distribution control ECU 14 controls the headlight driver 20 according to the state of the switch 16 so as to radiate light from the headlights 12, and also performs a light distribution control on the basis of the images taken by the camera 18 so that in the light distribution region irradiated by the headlights 12, at least one of a light region on a traveling road which reflects light and a light region on the traveling road which emits light has a darker light distribution than other regions on the traveling road.

Figure 2:
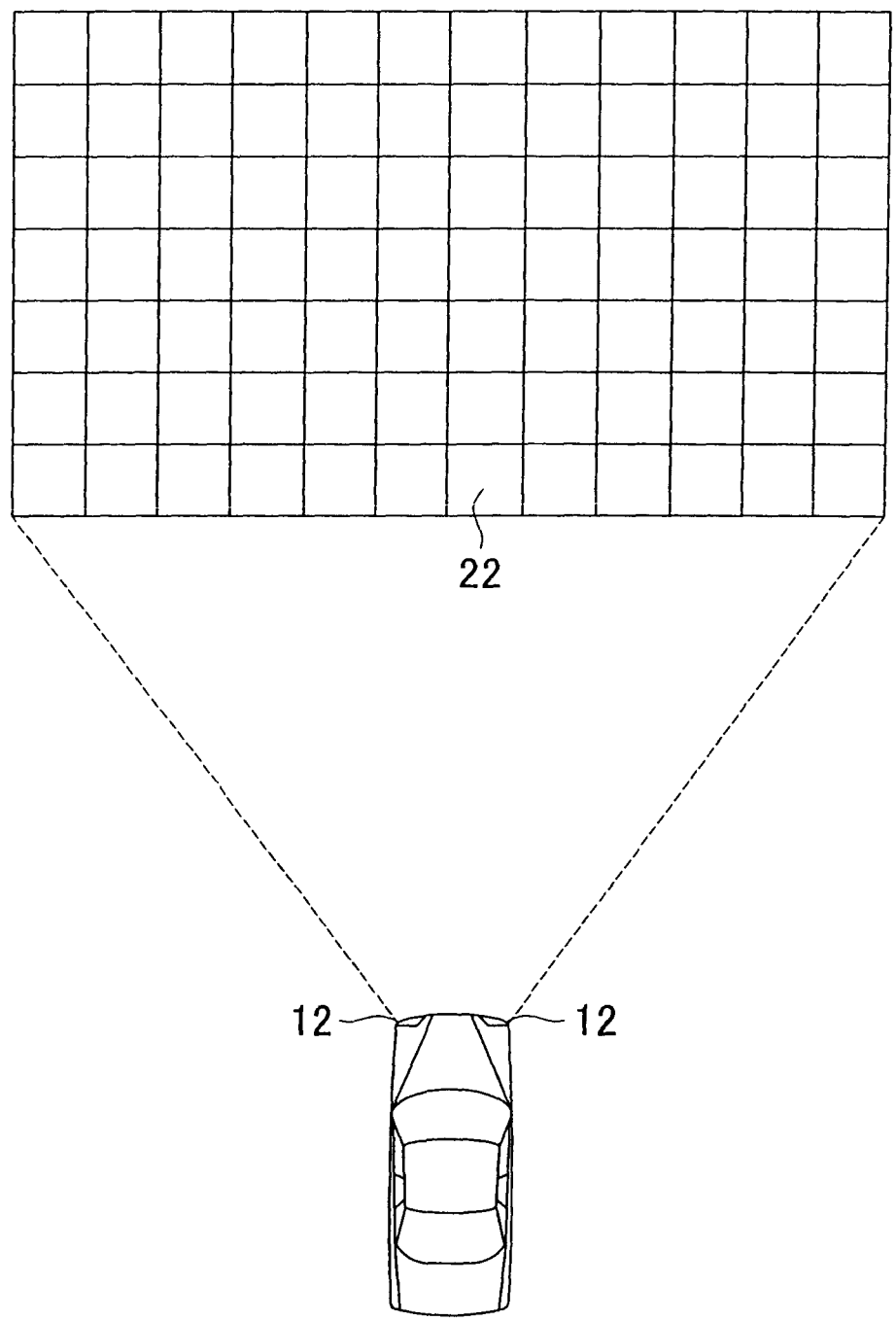
FIG. 2 is a diagram for describing divided regions of a light distributed range of a headlight of the vehicle lighting device in accordance with the first embodiment of the invention.

As for the headlights 12, two lights are provided in a front end portion of the vehicle. The light distribution region of the headlights 12 is divided into a plurality of regions 22 as shown in FIG. 2, either the radiation or the non-radiation of light can be selected for each of the divided regions 22, whereby the light distribution can be changed separately for each divided region. The radiation and non-radiation of light to each divided region is controlled by the light distribution control ECU 14.

Figure 3A:
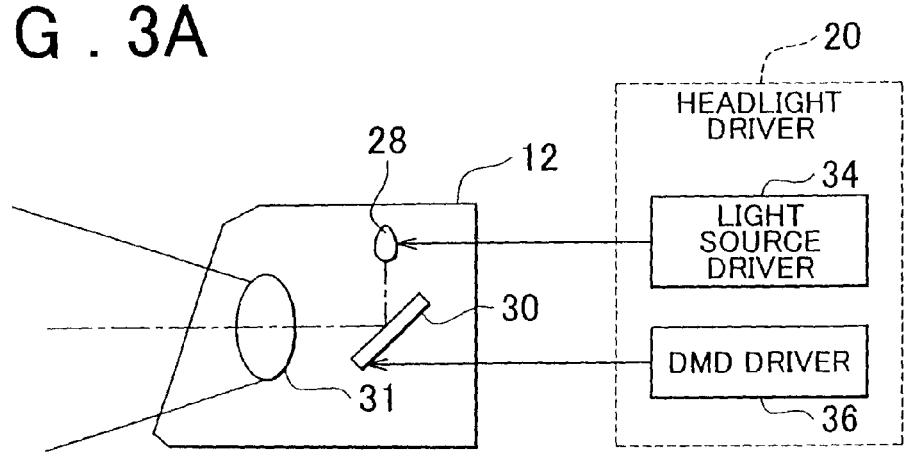
FIGS. 3A, 3B and 3C are diagrams showing an example of a headlight that can be applied to a vehicle lighting device in accordance with the first embodiment of the invention.
Figure 3B:
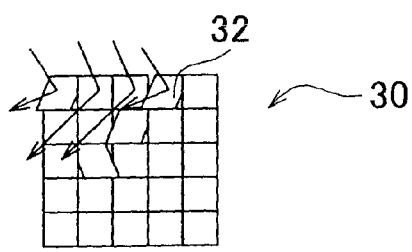
Figure 3C:
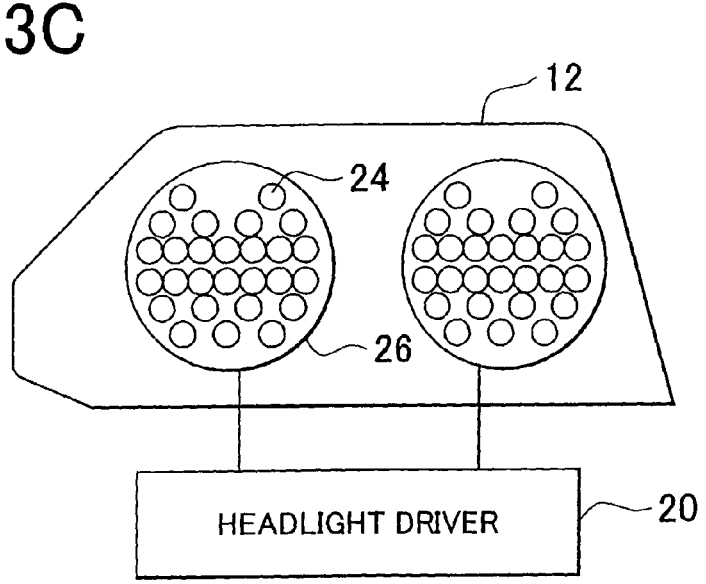

FIGS. 3A and 3C are diagrams showing an example of a headlight that is applicable to the vehicle lighting device 10 in accordance with the embodiment of the invention.

Each headlight 12 may be, for example, a headlight as shown in FIG. 3A in which the light from a light source 28 is reflected by a DMD (Digital Micromirror Device) 30, and is thus radiated to an area in front of the vehicle via a lens 31.

The DMD 30 is a device that has a plurality of micromirrors 32, and that is able to control the rotation of each micromirror 32. Specifically, a light source driver 34 that turns on the light source 28, and a DMD driver 36 that drives the rotation of each micromirror 32 of the DMD 30 are provided as the headlight driver 20. By turning on the light source 28 via the light source driver 34 and controlling the rotation of each micromirror 32 of the DMD 30 via the DMD driver 36, the radiation and non-radiation of light to each divided region as shown in FIG. 2 can be controlled.

In addition, each headlight 12 may be a light that has a plurality of LED light sources 24 as shown in FIG. 3C. In this case, the headlight driver 20 controls the turning on and off of the LED light sources 24, whereby the radiation or non-radiation of light to each divided region 22 shown in FIG. 2 can be carried out, and also the decrease or increase of radiation of light to each divided region 22, and the like can also be achieved. FIG. 3C shows an example of a headlight that includes two LED lamps 26 each of which has a plurality of LED light sources 24. For example, it is permissible to selectively use one of the LED lamps 26 for the low beam, and use the other one of the LED lamps 26 for the high beam.

In this embodiment, a headlight that includes the light source 28 and the DMD 30 shown in FIG. 3A is assumed for the following description. Besides, the construction of the headlights 12 is not limited to the foregoing construction. For example, it is permissible to adopt a construction in which a plurality of shutters that block light from one light source which illuminates an area in front of the vehicle are provided, and each shutter corresponds in size to its corresponding one of the divided regions, whereby the radiation and non-radiation of light to each divided region shown in FIG. 2 can be achieved. Instead of the DMD 30, a spatial light modulation element, such as a liquid crystal element or the like, other than the DMD 30, may be used.

Besides, the control of the distribution of the light radiated from the headlights 12 to each divided region 22 is performed as follows. That is, micromirrors 32 of the DMD 30 that correspond to the individual divided regions are determined beforehand. By selectively rotating the micromirrors 32 of the DMD 30 of each headlight 12, the light from light sources is controlled so as to radiate to the inside of a housing of the headlight 12 or to other regions, whereby the light radiated to a divided region 22 is prevented from radiating thereto, that is, is made non-radiating. A table that represents a correspondence relation between the divided regions and the micromirrors 32 of the DMD 30 is stored in the ROM 14C.

Herein, the light distribution control performed by the vehicle lighting device 10 in accordance with the embodiment of the invention will be described in detail.

White lines, reflectors and the like on roads are high in reflectance, and are better in visibility than common obstacles. Therefore, with such high-reflectance objects or the like being on the road, a vehicle driver may possibly misconceive that visibility is better than the actual visibility, and may drive beyond a safe speed.

Therefore, in this embodiment, using shot images of areas in front of the vehicle taken by the camera 18, light regions of reflection, such as white lines, reflectors, etc., and light regions of light emission, such as street lights or the like, are detected. Thus, light reflection/emission regions are detected. In the following description, it is assumed that the light regions of reflection and the light regions of emission are detected from shot images. However, it is also permissible to detect only one of the two types of light regions.

Then, divided regions 22 corresponding to the light distribution region irradiated by the headlights 12 which correspond to the detected light reflection/emission regions are specifically determined, and the headlights 12 are controlled so that the light radiated to the specifically determined divided regions 22 is reduced (in this embodiment, so that the non-radiating state is obtained). This restrains the misconception of the visibility as being good which is caused by a light region of reflection, such as a white line, a reflector, etc., or a light region of emission, such as a street light or the like, and therefore restrains excess traveling speeds.

Figure 4:
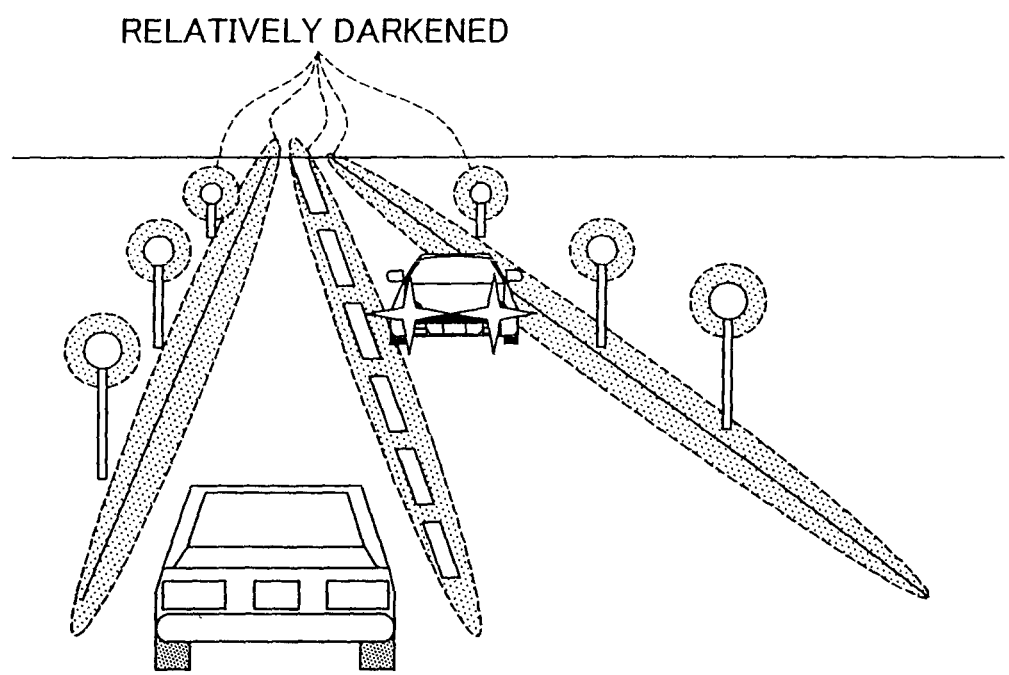
FIG. 4 is a diagram for describing a light distribution control that is performed by the vehicle lighting device in accordance with the first embodiment of the invention.

More concretely, by controlling the DMD 30 so that the micromirrors 32 of the DMD 30 that radiate light to the light reflection/emission regions detected from shot images radiate light to other regions, the light reflection/emission regions as shown in FIG. 4 (hatched portions in FIG. 4) which have been detected from shot images darkens relative to other regions. Incidentally, although it is assumed that this embodiment performs such a control that the light reflection/emission regions detected from shot images darken relative to other regions, the invention is not limited so. For example, the light reflection/emission regions may also be darkened relative to other regions by controlling the DMDs 30 so that the light radiated farthest or the light radiated most outwardly in the direction of the width of the vehicle is radiated to regions other than the light reflection/emission regions detected from shot images. Besides, the light reflection/emission regions may also be darkened relative to other regions by increasing the amount of light radiated to regions other than the light reflection/emission regions through the use of the LED light sources as shown in FIG. 3C, or the like.

Figure 5:
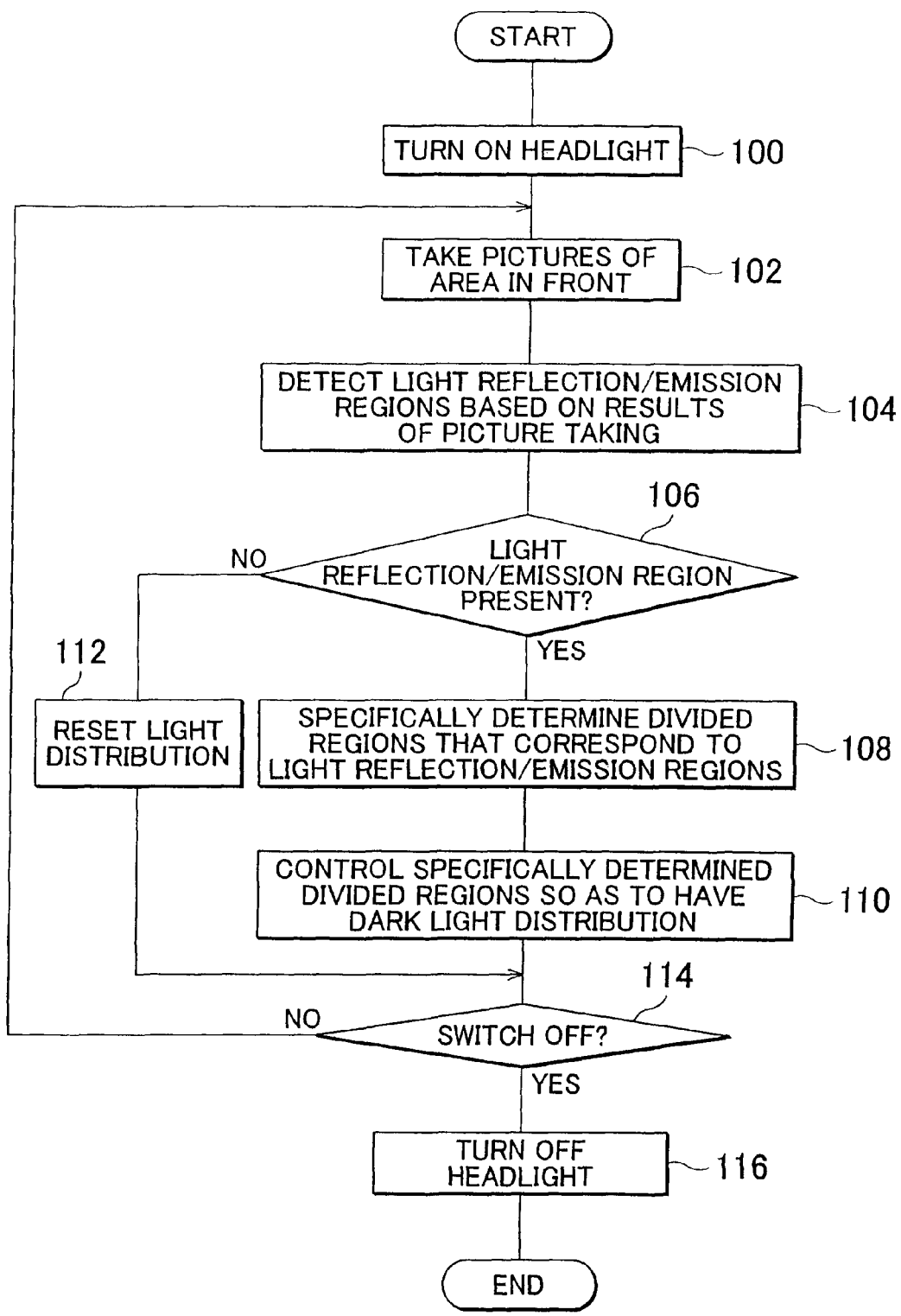
FIG. 5 is a flowchart showing an example of a light distribution control routine that is performed by a light distribution control ECU of the vehicle lighting device in accordance with the first embodiment of the invention.

Subsequently, the light distribution control performed by the light distribution control ECU 14 of the vehicle lighting device 10 in accordance with the embodiment of the invention constructed as described above will be described. FIG. 5 is a flowchart showing an example of a light distribution control routine that is executed by the light distribution control ECU 14 of the vehicle lighting device 10 in accordance with the first embodiment of the invention. Incidentally, the light distribution control routine shown in FIG. 5 is started, for example, when the turning-on of the headlights 12 is commanded by an occupant's operation of the switch 16. Besides, in the case where the switch 16 is provided with an automatic turning-on mode, the routine may be started when an occupant has commanded the automatic turning-on and a predetermined condition for turning on the headlights 12 is satisfied.

When the turning-on of the headlights 12 is commanded by an occupant operating the switch 16, the headlights 12 are turned on in step 100, and the process proceeds to step 102. That is, the CPU 14A turns on the headlights 12 by controlling the headlight driver 20 via the I/O 14D so as to drive the light source 28 of each of the headlights 12. Besides, the headlights 12 are turned on, with the micromirrors 32 of each DMD 30 being in the initial state, that is, at such positions as to provide general light distribution of the headlights 12. At this time, according to the state of the switch 16, the high-beam turning-on or the low-beam turning-on is performed, and in either one of the cases, a light distribution control as follows is performed.

In step 102, results of the camera 18 taking pictures of areas in front of the vehicle are acquired by the light distribution control ECU 14 via the I/O 14D. After that, the process proceeds to step 104.

In step 104, light reflection/emission regions (regions of white lines, reflectors, etc.) are detected by the CPU 14A on the basis of the results of the camera 18 taking pictures. After that, the process proceeds to step 106. Incidentally, light reflection/emission regions are detected from images taken by the camera 18 by performing, for example, pattern matching with luminescent spots that have a predetermined brightness or more, or with a predetermined shape that represents the shape of a white line, through an image processing. As for details of the method, various known technologies and the like can be used for the detection.

Subsequently in step 106, the CPU 14A determines whether or not there is a light reflection/emission region. If the determination is affirmative, the process proceeds to step 108. If the determination is negative, the process proceeds to step 112.

In step 108, the CPU 14A specifically determines divided regions 22 that corresponds to the light reflection/emission region. After that, the process proceeds to step 110.

In step 110, the CPU 14A controls the DMD driver 36 so that the specifically determined divided regions 22 have a dark light distribution. After that, the process proceeds to step 114. Specifically, micromirrors 32 of each DMD 30 that correspond to the specifically determined divided regions 22 are rotationally driven and controlled so that the light reflected by the micromirrors is radiated to other regions (e.g., areas that are outermost in the vehicle width direction, or in the vicinity of the host vehicle, or the like, etc.). As a result of this, the light reflection/emission region darkens relative to the other regions, so that the vehicle driver will not misconceive that visibility is good, and can be prompted to restrain the vehicle speed.

On the other hand, in step 112, since it can happen that the light distribution control by step 110 has already been performed, the CPU 14A turns on the headlights 12 so that the light distribution is reset, that is, returns to the initial state of light distribution. After that, the process proceeds to step 114.

Then in step 114, the CPU 14A determines whether or not the switch 16 has been turned off. If the determination is negative, the process returns to step 102, in which the foregoing process is repeated. When the determination in step 114 is affirmative, the process proceeds to step 116, in which the CPU 14A turns off the headlights 12. After that, the CPU 14A ends the foregoing series of processes.

In this manner, in the case where the switch 16 is operated to command the turning-on of the headlights 12, the light distribution control ECU 14 in the embodiment shoots pictures of areas in front of the vehicle by the camera 18, and performs the light distribution control of the headlights 12 on the basis of the shot images so that the divided regions 22 that correspond to the light reflection/emission regions (light regions of reflection, such as white lines, reflectors, etc., and light regions of light emission, such as street lights or the like) have a dark light distribution relative to other regions. Therefore, it is possible to restrain a misconception of visibility as being good due to the light regions of reflection, such as lines, reflectors, etc., and light regions of light emission, such as street lights or the like, and to prompt restraint of the vehicle speed.

Subsequently, a vehicle lighting device in accordance with a second embodiment of the invention will be described.

While in the first embodiment the light distribution control is performed so that the light reflection/emission regions have a relatively reduced amount of light relative to other regions in the light distribution region that is irradiated by the headlights 12 regardless of which one of the low beam and the high beam is selected, the second embodiment is constructed so as to perform the light distribution control only with respect to the high-beam region.

The construction of the vehicle lighting device in accordance with the second embodiment is basically the same as that in the first embodiment, and therefore only differences will be described with reference to FIG. 1.

In the second embodiment, correspondence relations between the divided regions 22 and regions in shot images that correspond to a predetermined low-beam region and a high-beam region, respectively, are pre-stored in the ROM 14C, and the light distribution control ECU 14 detects light reflection/emission regions from shot images taken by the camera 18, and specifically determines divided regions 22 that correspond to regions among the detected light reflection/emission regions that are within the low-beam region. Then, the light distribution control is performed so that the specifically determined divided regions have a dark light distribution relative to other regions.

Figure 6:
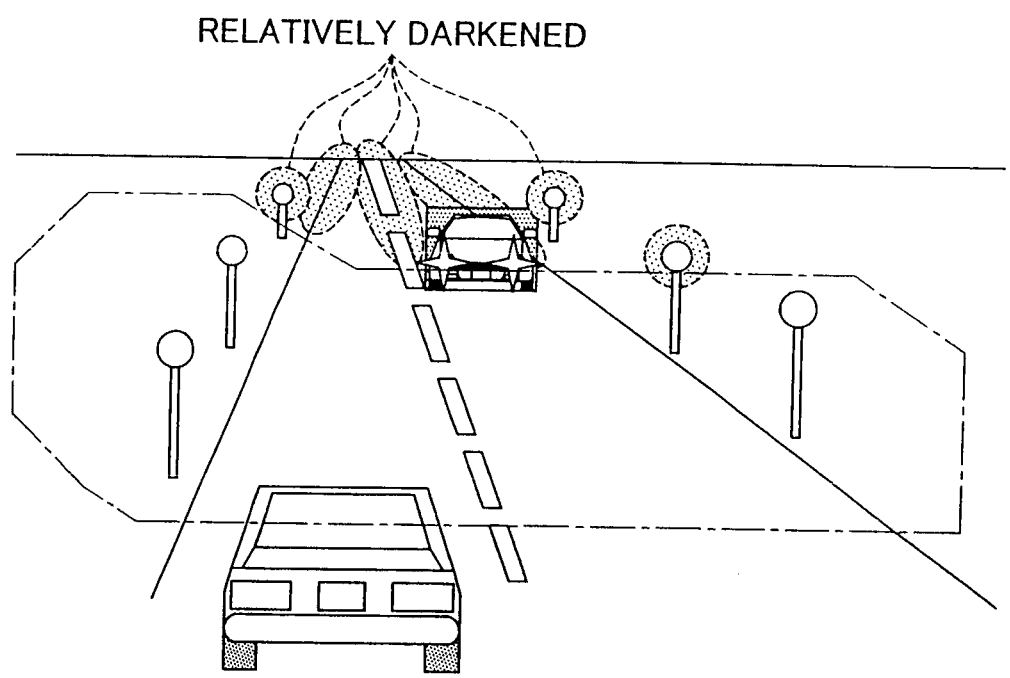
FIG. 6 is a diagram for describing the light distribution control that is performed by a vehicle lighting device in accordance with a second embodiment of the invention.

That is, as shown in FIG. 6, light reflection/emission regions (hatched portions in FIG. 6) in the high-beam region that is farther than the predetermined low-beam region shown by a one-dot dashed line are detected, and the light distribution is controlled so that only the light reflection/emission regions in the high-beam region have a dark light distribution relative to other regions.

Besides, in the embodiment, it is assumed that the vehicle travels normally with the high beam, and an oncoming vehicle is detected from shot images taken by the camera 18, and the light distribution is controlled so that the light radiated to the divided regions that correspond to the oncoming vehicle is not radiated. This restrains the glare light to the oncoming vehicles. Besides, the light distribution control may also be performed so that the amount of light radiated to divided regions that correspond to oncoming vehicles is reduced.

Figure 7:
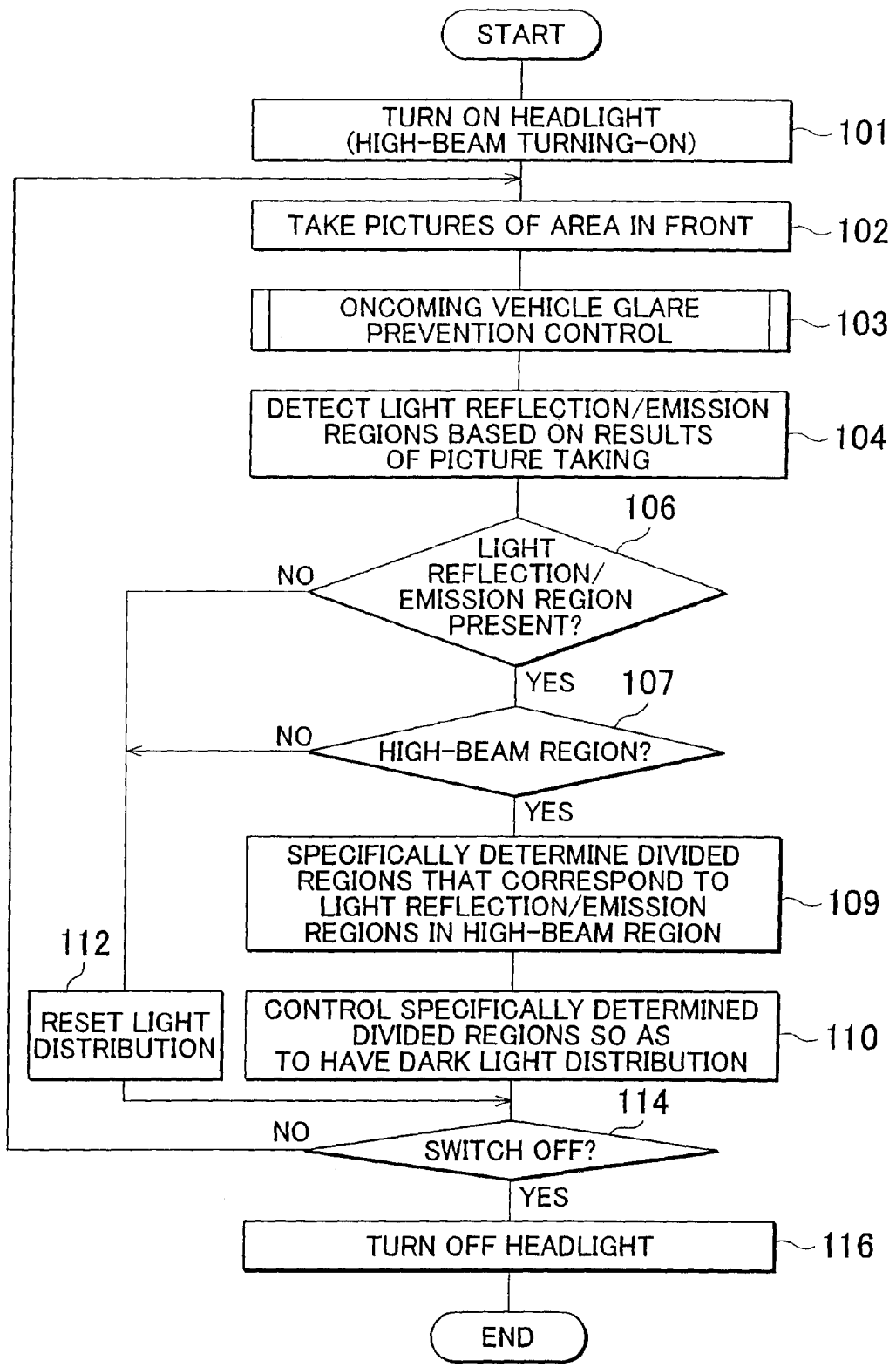
FIG. 7 is a flowchart showing an example of the light distribution control routine that is performed by a light distribution control ECU of the vehicle lighting device in accordance with the second embodiment of the invention.

Subsequently, a light distribution control performed by the light distribution control ECU 14 of the vehicle lighting device in accordance with the second embodiment of the invention will be described. FIG. 7 is a flowchart showing an example of the light distribution control routine that is performed by the light distribution control ECU 14 of the vehicle lighting device in accordance with the second embodiment of the invention. The light distribution control routine shown in FIG. 7 starts, for example, when the turning on of the headlights 12 is commanded by an occupant operating the switch 16. Besides, in the case where the switch 16 is provided with an automatic turning-on mode, the routine may be started when the automatic turning-on has been commanded by an occupant and a predetermined condition for turning on the headlights 12 is satisfied. The same processes as those in the first embodiment are presented with the same reference characters in the description below.

When the turning-on of the headlights 12 is commanded by an occupant operating the switch 16, the headlights 12 are turned on in the high-beam mode in step 101. After that, the process proceeds to step 102. That is, the CPU 14A turns on the headlights 12 by controlling the headlight driver 20 via the I/O 14D so as to drive the light source 28 of each of the headlights 12. Besides, the headlights 12 are turned on, with the micromirrors 32 of each DMD 30 being in the initial state, that is, at such positions as to provide general light distribution of the headlights 12. In addition, at this time, the high-beam turning-on is performed in this embodiment.

In step 102, results of the camera 18 taking pictures of areas in front of the vehicle are acquired by the light distribution control ECU 14 via the I/O 14D. After that, the process proceeds to step 103.

Figure 8:
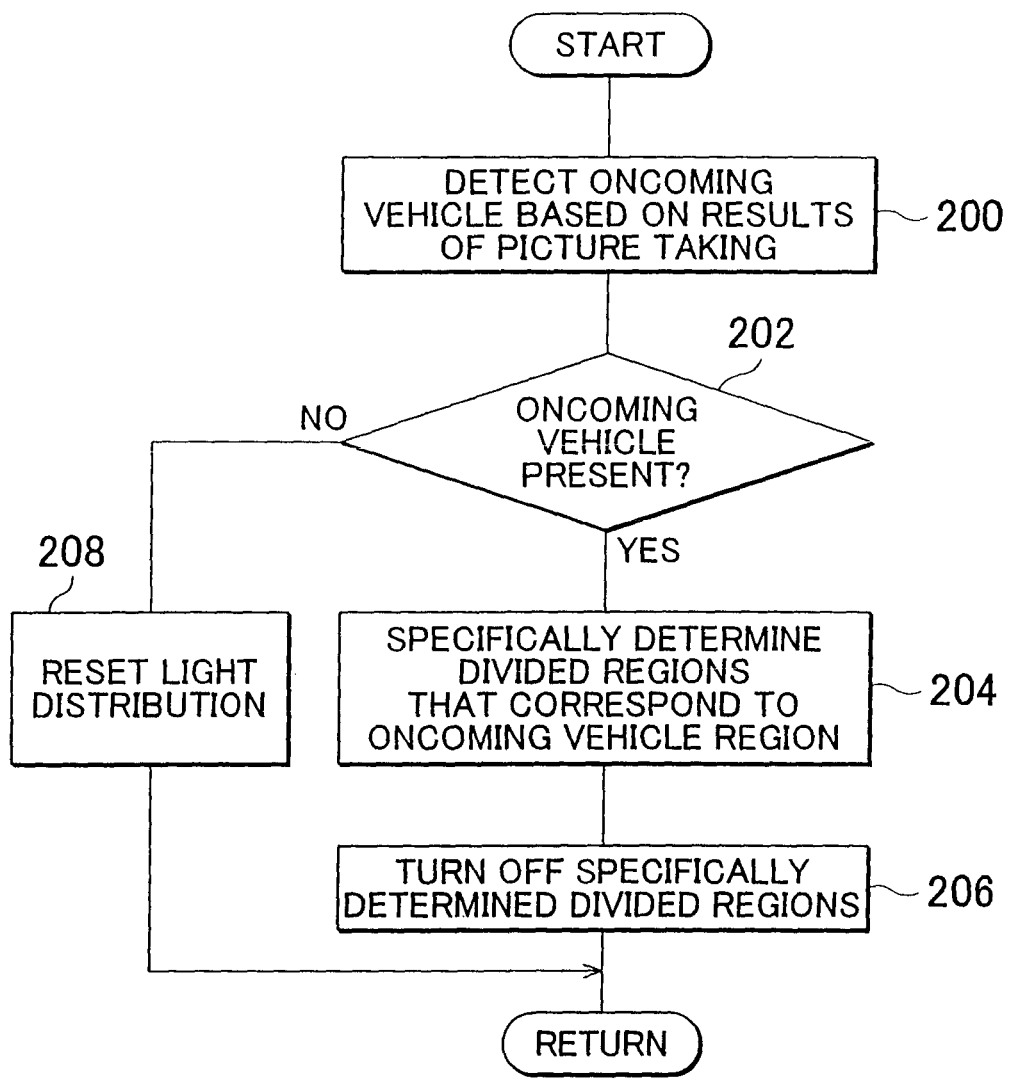
FIG. 8 is a flowchart showing an example of the flow of an oncoming vehicle glare prevention control.

In step 103, a glare prevention control for oncoming vehicles is performed. The oncoming vehicle glare prevention control will be described in detail with reference to FIG. 8.

When the oncoming vehicle glare prevention control is started, the CPU 14A detects in step 200 an oncoming vehicle on the basis of results of the camera 18 taking pictures. After that, the process proceeds to step 202. The detection of an oncoming vehicle is performed by detecting luminescent spots through an image processing of shot images taken by the camera 18. As for details of the method, various known technologies can be used for the detection.

Subsequently in step 202, the CPU 14A determines whether or not there is an oncoming vehicle. If the determination is affirmative, the process proceeds to step 204. If the determination is negative, the process proceeds to step 208.

In step 204, the CPU 14A specifically determines divided regions that correspond to the oncoming vehicle. After that, the process proceeds to step 206.

In step 206, the lighting of the specifically divided regions is stopped, and the oncoming vehicle glare prevention control is ended. After that, the process proceeds to step 104 in FIG. 7. That is, the light distribution control ECU 14 controls the headlight driver 20 so that the light radiated to the specifically determined divided regions 22 stops radiating. Therefore, even when the vehicle is traveling with the high beam, the glare light to the oncoming vehicle can be restrained. For example, the lighting of the specifically determined divided regions 22 can be stopped by rotationally driving and controlling micromirrors 32 of each DMD 30 that correspond to the specifically determined divided regions 22 in such a fashion that light from the micromirrors 32 is radiated to other regions.

On the other hand, in step 208, since there is possibility that the lighting of divided regions 22 that correspond to an oncoming vehicle has been stopped, the CPU 14A turns on the headlights 12 so that the light distribution is reset, that is, returns to the initial state of light distribution. Then, the oncoming vehicle glare prevention control is ended, and the process proceeds to step 104 in FIG. 7.

Although in the oncoming vehicle glare prevention control of this embodiment, the glare light to the oncoming vehicle is intended to be prevented by removing the radiation of light to divided regions that correspond to the oncoming vehicle, the oncoming vehicle glare prevention control is not limited so. For example, in the case where an oncoming vehicle is detected, the headlights 12 may be switched to the low beam. In this case, it suffices to return to step 102 in FIG. 7 after the oncoming vehicle glare prevention control ends.

In the meantime, after returning to the process in FIG. 7, the CPU 14A detects in step 104 light reflection/emission regions (regions of white lines, reflectors, etc.) on the basis of results of the picture taking of the camera 18. After that, the process proceeds to step 106. Incidentally, light reflection/emission regions are detected from images taken by the camera 18 by performing, for example, pattern matching with luminescent spots that have a predetermined brightness or more, or with a predetermined shape that represents the shape of a white line, through an image processing. As for details of the method, various known technologies and the like can be used for the detection.

Subsequently in step 106, the CPU 14A determines whether or not there is a light reflection/emission region. If the determination is affirmative, the process proceeds to step 107. If the determination is negative, the process proceeds to step 112.

In step 107, the CPU 14A determines whether or not the detected light reflection/emission region or regions are in the high-beam region. In this determination, it is determined whether or not the detected light reflection/emission regions correspond to the predetermined high-beam region that is stored in the ROM 14C. If the determination is affirmative, the process proceeds to step 109. If the determination is negative, the process proceeds to step 112.

In step 109, the CPU 14A specifically determines divided regions 22 that correspond to the light reflection/emission regions in the high-beam region.

In step 110, the CPU 14A controls the DMD driver 36 so that the specifically determined divided regions 22 have a dark light distribution. After that, the process proceeds to step 114. Specifically, micromirrors 32 of each DMD 30 that correspond to the specifically determined divided regions 22 are rotationally driven and controlled so that the light reflected by the micromirrors is radiated to other regions (e.g., areas that are outermost in the vehicle width direction, or in the vicinity of the host vehicle, or the like, etc.). As a result of this, the light reflection/emission regions in the high-beam region darkens relative to the other regions, so that the vehicle driver will not misconceive that visibility is good, and can be prompted to restrain the vehicle speed.

On the other hand, in step 112, since it can happen that the light distribution control by step 110 has already been performed, the CPU 14A turns on the headlights 12 so that the light distribution is reset, that is, returns to the initial state of light distribution. After that, the process proceeds to step 114.

Then in step 114, the CPU 14A determines whether or not the switch 16 has been turned off. If the determination is negative, the process returns to step 102, in which the foregoing process is repeated. When the determination in step 114 is affirmative, the process proceeds to step 116, in which the CPU 14A turns off the headlights 12. After that, the CPU 14A ends the foregoing series of processes.

Thus, in this embodiment, by performing the light distribution control of the headlights 12 only with respect to the high-beam region so that the divided regions 22 that correspond to light reflection/emission regions (light regions of reflection, such as white lines, reflectors, etc., and light regions of light emission, such as street lights or the like) have a dark light distribution relative to other regions, it is possible to prevent a misconception that the entire field of view is visible, and prompt restraint of the vehicle speed. Besides, since the light distribution control is performed only in the high-beam region, a certain recognizability of light reflection/emission regions can be secured with regard to areas near the host vehicle.

Figure 9:
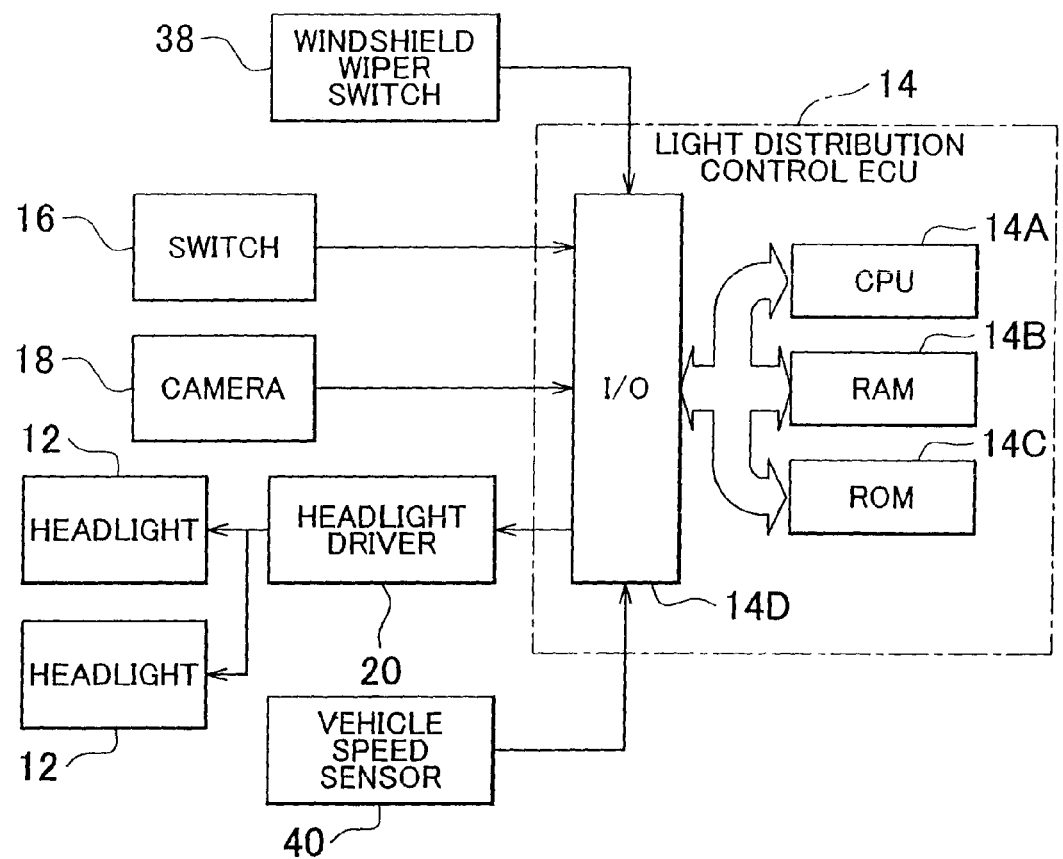
FIG. 9 is a block diagram showing a construction of a vehicle lighting device in accordance with a third embodiment of the invention.

Subsequently, a vehicle lighting device in accordance with a third embodiment of the invention will be described. FIG. 9 is a block diagram showing a construction of the vehicle lighting device in accordance with the third embodiment of the invention.

In the first embodiment, light reflection/emission regions are detected, and the light distribution is controlled so that the light radiated to the detected light reflection/emission regions darkens relative to other regions. In the second embodiment, the light distribution control as in the first embodiment is performed only with respect to the high-beam region. In the third embodiment, however, the light distribution control as in the first embodiment is performed only for a region that is apart from the vehicle by a braking distance or more. The same constructions as those in the first embodiment are presented with the same reference characters, and detailed descriptions thereof are omitted below.

The vehicle lighting device in accordance with the third embodiment of the invention is different from the device of the first embodiment in that a windshield wiper switch 38 is connected to the I/O 14D of the light distribution control ECU 14 as shown FIG. 9 so that the state of operation of the windshield wiper switch 38 is input to the light distribution control ECU 14. The light distribution control ECU 14 determines whether or not it is raining from the state of operation of the windshield wiper switch 38. This embodiment will be described on the assumption that it is determined whether or not it is raining from the state of operation of the windshield wiper switch 38, the determination as to whether or not it is raining is not limited to the determination based on the state of operation of the windshield wiper switch 38. For example, instead of the windshield wiper switch 38, a raindrop sensor may be provided, and it may be determined whether or not it is raining from a result of the detection by the raindrop sensor, or other methods may also be applied.

Furthermore, in the vehicle lighting device in accordance with the third embodiment, a vehicle speed sensor 40 is connected to the I/O 14D of the light distribution control ECU 14, and results of the detection of the vehicle speed performed by the vehicle speed sensor 40 are input to the light distribution control ECU 14.

In this embodiment, the braking distances for individual vehicle speeds for the time of rain and for the time of sunshine are predetermined in the ROM 14C of the light distribution control ECU 14, and positions in shot images that correspond to the braking distances and the divided regions that correspond thereto are determined and stored beforehand in the ROM 14C as well.

The light distribution control ECU 14 of this embodiment determines the braking distance, and performs the light distribution control described above in conjunction with the first embodiment only with respect to a region that is apart from the vehicle by the braking distance or more.

Figure 10:
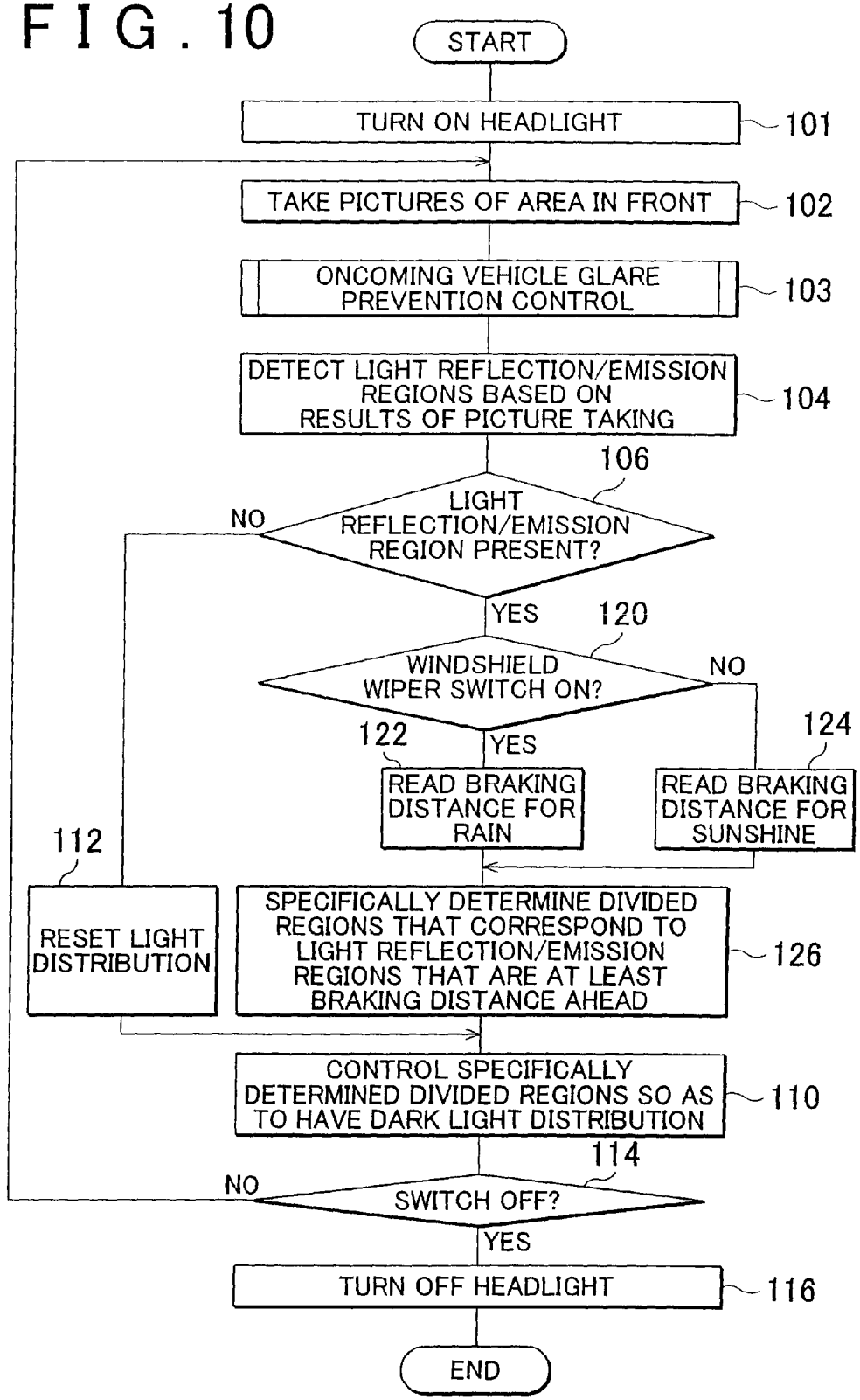
FIG. 10 is a flowchart showing an example of the light distribution control routine that is performed by a light distribution control ECU of the vehicle lighting device in accordance with the third embodiment of the invention.

Next, a light distribution control performed by the light distribution control ECU 14 of the vehicle lighting device in accordance with the third embodiment of the invention constructed as described above will be described. FIG. 10 is a flowchart showing an example of a light distribution control routine that is performed by the light distribution control ECU 14 of the vehicle lighting device in accordance with the third embodiment of the invention. Incidentally, the light distribution control routine shown in FIG. 10 starts, for example, when the turning on of the headlights 12 is commanded by an occupant operating the switch 16. Besides, in the case where the switch 16 is provided with an automatic turning-on mode, the routine may be started when the automatic turning-on has been commanded by an occupant and a predetermined condition for turning on the headlights 12 is satisfied. The same processes as those in the first embodiment are presented with the same reference characters in the description below.

When the turning-on of the headlights 12 is commanded by an occupant operating the switch 16, the headlights 12 are turned on in step 100, and the process proceeds to step 102. That is, the CPU 14A turns on the headlights 12 by controlling the headlight driver 20 via the I/O 14D so as to drive the light source 28 of each of the headlights 12. Besides, the headlights 12 are turned on, with the micromirrors 32 of each DMD 30 being in the initial state, that is, at such positions as to provide general light distribution of the headlights 12. In addition, at this time, the high-beam turning-on is performed in this embodiment.

In step 102, results of the camera 18 taking pictures of areas in front of the vehicle are acquired by the light distribution control ECU 14 via the I/O 14D. After that, the process proceeds to step 103.

In step 103, the glare prevention control for an oncoming vehicle is performed. After that, the process proceeds to step 104. The oncoming vehicle glare prevention control is substantially the same process as in FIG. 8 described above in conjunction with the second embodiment, and therefore the detailed description thereof is omitted below.

Subsequently in step 104, the CPU 14A detects light reflection/emission regions (regions of white lines, reflectors, etc.) on the basis of results of the picture taking of the camera 18. After that, the process proceeds to step 106. Incidentally, light reflection/emission regions are detected from images taken by the camera 18 by performing, for example, pattern matching with luminescent spots that have a predetermined brightness or more, or with a predetermined shape that represents the shape of a white line, through an image processing. As for details of the method, various known technologies and the like can be used for the detection.

Subsequently in step 106, the CPU 14A determines whether or not there is a light reflection/emission region. If the determination is affirmative, the process proceeds to step 120. If the determination is negative, the process proceeds to step 112.

In step 120, the CPU 14A determines whether or not the windshield wiper switch 38 is on. If the determination is affirmative, the process proceeds to step 122. If the determination is negative, the process proceeds to step 124.

In step 122, the CPU 14A reads the position in a shot image which is at the braking distance for rain stored in the ROM 14C. After that, the process proceeds to step 126. On the other hand, in step 124, the CPU 14A reads the position in a shot image which is at the braking distance for sunshine stored in the ROM 14C. After that, the process proceeds to step 126. Incidentally, the braking distance varies depending on the vehicle speed, and the ROM 14C pre-stores braking distances, the positions in shot images and divided regions that correspond to the braking distances separately for each of vehicle speeds. Therefore, when the position in a shot image which is at the braking distance for rain or sunshine is to be read, the braking distance that corresponds to the vehicle speed detected by the vehicle speed sensor 40 is read, and the position in the shot image which corresponds to the read braking distance is read.

In step 126, divided regions 22 that correspond to the region in the shot image at the read braking distance and more are specifically determined. After that, the process proceeds to step 110.

In step 110, the CPU 14A controls the DMD driver 36 so that the specifically determined divided regions 22 have a dark light distribution. After that, the process proceeds to step 114. Specifically, micromirrors 32 of each DMD 30 that correspond to the specifically determined divided regions 22 are rotationally driven and controlled so that the light reflected by the micromirrors is radiated to other regions (e.g., areas that are outermost in the vehicle width direction, or in the vicinity of the host vehicle, or the like, etc.). As a result of this, the light reflection/emission regions in the region that is at least the braking distance apart from the vehicle darkens relative to the other regions, so that the vehicle driver will not misconceive that visibility is good, and can be prompted to restrain the vehicle speed.

On the other hand, in step 112, since it can happen that the light distribution control by step 110 has already been performed, the CPU 14A turns on the headlights 12 so that the light distribution is reset, that is, returns to the initial state of light distribution. After that, the process proceeds to step 114.

Then in step 114, the CPU 14A determines whether or not the switch 16 has been turned off. If the determination is negative, the process returns to step 102, in which the foregoing process is repeated. When the determination in step 114 is affirmative, the process proceeds to step 116, in which the CPU 14A turns off the headlights 12. After that, the CPU 14A ends the foregoing series of processes.

Thus, in this embodiment, by performing the light distribution control of the headlights 12 only with respect to the region apart from the vehicle by at least the braking distance so that the divided regions 22 that correspond to light reflection/emission regions (light regions of reflection, such as white lines, reflectors, etc., and light regions of light emission, such as street lights or the like) have a dark light distribution relative to other regions, it is possible to prevent a misconception that the entire field of view is visible, and prompt restraint of the vehicle speed as in the second embodiment. Besides, since the light distribution control is performed only in the region apart from the vehicle by at least the braking distance, a certain recognizability of light reflection/emission regions can be secured with respect to areas near the host vehicle.

Besides, in the second embodiment the light distribution control is performed only in the high-beam region, and in the third embodiment the light distribution control is performed only in the region apart from the vehicle by at least the braking distance. However, the light distribution control may also be performed with respect to any other region as long as the light distribution control is performed only in a region that is apart from the vehicle by at least a predetermined distance.

In the description of the third embodiment, it is assumed that the high-beam turning-on is performed. However, the foregoing control may also be performed both with the high beam and the low beam by selectively performing the high-beam turning-on or the low-beam turning-on according to the state of operation of the switch 16.

Subsequently, a vehicle lighting device in accordance with a fourth embodiment of the invention will be described. The fourth embodiment is basically the same in construction as the first embodiment, and is different from the first embodiment merely in that as in the third embodiment, a windshield wiper switch 38 is connected to the I/O 14D of the light distribution control ECU 14. Therefore, detailed descriptions of the construction of the fourth embodiment are omitted below.

In the first embodiment, light reflection/emission regions are detected, and the light distribution is controlled so that the light radiated to the detected light reflection/emission regions darkens relative to other regions. In the second embodiment, the light distribution control as in the first embodiment is performed only with respect to the high-beam region. In the third embodiment, the light distribution control as in the first embodiment is performed only for a region that is apart from the vehicle by at least the braking distance. In the fourth embodiment, during rain, the light distribution control as in the first embodiment in which the light reflection/emission regions are darkened relative to other regions is prohibited, and the light distribution is controlled in an opposite fashion, that is, the light distribution is controlled so that the light radiated to the detected light reflection/emission regions is brightened relative to other regions.

A light distribution control performed by the light distribution control ECU 14 of the vehicle lighting device in accordance with the fourth embodiment of the invention will be described. FIG. 11 is a flowchart showing an example of the light distribution control routine performed by the light distribution control ECU 14 of the vehicle lighting device in accordance with the fourth embodiment of the invention. The light distribution control routine shown in FIG. 11 is started, for example, when the turning on of the headlights 12 is commanded by an occupant operating the switch 16. Besides, in the case where the switch 16 is provided with an automatic turning-on mode, the routine may be started when the automatic turning-on has been commanded by an occupant and a predetermined condition for turning on the headlights 12 is satisfied. The same processes as those in the first embodiment are presented with the same reference characters in the description below.

When the turning-on of the headlights 12 is commanded by an occupant operating the switch 16, the headlights 12 are turned on in step 100, and the process proceeds to step 102. That is, the CPU 14A turns on the headlights 12 by controlling the headlight driver 20 via the I/O 14D so as to drive the light source 28 of each of the headlights 12. Besides, the headlights 12 are turned on, with the micromirrors 32 of each DMD 30 being in the initial state, that is, at such positions as to provide general light distribution of the headlights 12. At this time, according to the state of the switch 16, the high-beam turning-on or the low-beam turning-on is performed, and in either one of the cases, a light distribution control as follows is performed.

In step 102, results of the camera 18 taking pictures of areas in front of the vehicle are acquired by the light distribution control ECU 14 via the I/O 14D. After that, the process proceeds to step 104.

in step 104, light reflection/emission regions (regions of white lines, reflectors, etc.) are detected by the CPU 14A on the basis of the results of the camera 18 taking pictures. After that, the process proceeds to step 106. Incidentally, light reflection/emission regions are detected from images taken by the camera 18 by performing, for example, pattern matching with luminescent spots that have a predetermined brightness or more, or with a predetermined shape that represents the shape of a white line, through an image processing. As for details of the method, various known technologies and the like can be used for the detection.

Subsequently in step 106, the CPU 14A determines whether or not there is a light reflection/emission region. If the determination is affirmative, the process proceeds to step 108. If the determination is negative, the process proceeds to step 112.

In step 108, the CPU 14A specifically determines divided regions 22 that corresponds to the light reflection/emission region. After that, the process proceeds to step 130.

In step 130, the CPU 14A determines whether or not the windshield wiper switch 38 is on. If the determination is affirmative, the process proceeds to step 132. If the determination is negative, the process proceeds to step 110.

In step 132, the CPU 14A controls the DMD driver 36 so that the specifically determined divided regions 22 have a bright light distribution. After that, the process proceeds to step 114. That is, micromirrors 32 of each DMD 30 that correspond to regions other than the specifically determined divided regions 22 (e.g., areas that are outermost in the vehicle width direction, or in the vicinity of the host vehicle, or the like, etc.) are rotationally driven and controlled so that the light reflected by the micromirrors is radiated to the specifically determined divided regions. As a result of this, at the time of rain, the light reflection/emission regions brighten relative to the other regions. In this manner, assist in the visibility of white lines or the shape of a road surface during travel in rain can be performed. Incidentally, step 132 may be omitted. That is, at the time of rain, the relative darkening of the light reflection/emission regions may be prohibited to give priority to the recognition of white lines during rain.

In step 110, the CPU 14A controls the DMD driver 36 so that the specifically determined divided regions 22 have a dark light distribution. After that, the process proceeds to step 114. That is, micromirrors 32 of each DMD 30 that correspond to the specifically determined divided regions 22 are rotationally driven and controlled so that the light reflected by the micromirrors is radiated to other regions (e.g., areas that are outermost in the vehicle width direction, or in the vicinity of the host vehicle, or the like, etc.). As a result, the light reflection/emission regions darken relative to other regions, so that the vehicle driver will not misconceive that visibility is good, and can be prompted to restrain the vehicle speed.

On the other hand, in step 112, since it can happen that the light distribution control by step 110 or 132 has already been performed, the CPU 14A turns on the headlights 12 so that the light distribution is reset, that is, returns to the initial state of light distribution. After that, the process proceeds to step 114.

Then in step 114, the CPU 14A determines whether or not the switch 16 has been turned off. If the determination is negative, the process returns to step 102, in which the foregoing process is repeated. When the determination in step 114 turns affirmative, the process proceeds to step 116, in which the CPU 14A turns off the headlights 12. After that, the CPU 14A ends the foregoing series of processes.

In this embodiment, at the time of rain, the light distribution control as in the first embodiment is prohibited, and a light distribution control in an opposite fashion is performed. That is, at the time of rain, the irregular reflection from the road surface increases, and therefore the visibility of a road surface shape or the like declines if the light distribution control is performed so that the light reflection/emission regions darken. Therefore, by prohibiting this control during rain, visibility of a white line and the like during rain can be secured.

Furthermore, if the control is performed in an opposite fashion, that is, if the light distribution is controlled so that the light reflection/emission regions of white lines and the like brighten relative to other regions, visibility during rain can be further secured, with priority given to the recognition of light reflection/emission regions, such as white lines, street lights, etc.

Subsequently, a vehicle lighting device in accordance with a fifth embodiment of the invention will be described. The construction of the vehicle lighting device in this embodiment is basically the same as that in the first embodiment, and detailed descriptions thereof are omitted below.

In the first embodiment, light reflection/emission regions are detected, and the light distribution is controlled so that the light radiated to the detected light reflection/emission regions darkens relative to other regions. In the second embodiment, the light distribution control as in the first embodiment is performed only with respect to the high-beam region. In the third embodiment, the light distribution control as in the first embodiment is performed only for a region that is apart from the vehicle by at least the braking distance. In the fourth embodiment, the light distribution control that is opposite to that in the first embodiment is performed during rain. In the fifth embodiment, pedestrians, obstacles, etc., are detected from shot images, and the light distribution control as in the first embodiment is performed only in the case where a pedestrian, an obstacle or the like is detected.

A light distribution control performed by the light distribution control ECU 14 of the vehicle lighting device in accordance with the fifth embodiment of the invention will be described. FIG. 12 is a flowchart showing an example of the light distribution control routine performed by the light distribution control ECU 14 of the vehicle lighting device in accordance with the fifth embodiment of the invention. The light distribution control routine shown in FIG. 12 is started, for example, when the turning on of the headlights 12 is commanded by an occupant operating the switch 16. Besides, in the case where the switch 16 is provided with an automatic turning-on mode, the routine may be started when the automatic turning-on has been commanded by an occupant and a predetermined condition for turning on the headlights 12 is satisfied. The same processes as those in the first embodiment are presented with the same reference characters in the description below.

When the turning-on of the headlights 12 is commanded by an occupant operating the switch 16, the headlights 12 are turned on in step 100, and the process proceeds to step 102. That is, the CPU 14A turns on the headlights 12 by controlling the headlight driver 20 via the I/O 14D so as to drive the light source 28 of each of the headlights 12. Besides, the headlights 12 are turned on, with the micromirrors 32 of each DMD 30 being in the initial state, that is, at such positions as to provide general light distribution of the headlights 12. At this time, according to the state of the switch 16, the high-beam turning-on or the low-beam turning-on is performed, and in either one of the cases, a light distribution control as follows is performed.

In step 102, results of the camera 18 taking pictures of areas in front of the vehicle are acquired by the light distribution control ECU 14 via the I/O 14D. After that, the process proceeds to step 134.

In step 134, light reflection/emission regions (regions of white lines, reflectors, etc.), and obstacles that include pedestrians are detected by the CPU 14A on the basis of the results of the camera 18 taking pictures. After that, the process proceeds to step 106. Incidentally, light reflection/emission regions are detected from images taken by the camera 18 by performing, for example, pattern matching with luminescent spots that have a predetermined brightness or more, or with a predetermined shape that represents the shape of a white line, through an image processing. As for details of the method, various known technologies and the like can be used for the detection. Besides, obstacles that include pedestrians can also be detected from images shot by the camera 18, by, for example, detecting a moving object or the like or performing pattern matching with predetermined shapes of obstacles, through an image processing.

Subsequently in step 136, the CPU 14A determines whether or not there is a pedestrian or any other obstacle. If the determination is affirmative, the process proceeds to step 106. If the determination is negative, the process proceeds to step 112.

In step 106, the CPU 14A determines whether or not there is a light reflection/emission region. If the determination is affirmative, the process proceeds to step 108. If the determination is negative, the process proceeds to step 112.

In step 108, the CPU 14A specifically determines divided regions 22 that corresponds to the light reflection/emission region. After that, the process proceeds to step 110.

In step 110, the CPU 14A controls the DMD driver 36 so that the specifically determined divided regions 22 have a dark light distribution. After that, the process proceeds to step 114. Specifically, micromirrors 32 of each DMD 30 that correspond to the specifically determined divided regions 22 are rotationally driven and controlled so that the light reflected by the micromirrors is radiated to other regions (e.g., areas that are outermost in the vehicle width direction, or in the vicinity of the host vehicle, or the like, etc.). As a result, the light reflection/emission regions darken relative to other regions, so that the vehicle driver will not misconceive that visibility is good, and can be prompted to restrain the vehicle speed.

On the other hand, in step 112, since it can happen that the light distribution control by step 110 has already been performed, the CPU 14A turns on the headlights 12 so that the light distribution is reset, that is, returns to the initial state of light distribution. After that, the process proceeds to step 114.

Then in step 114, the CPU 14A determines whether or not the switch 16 has been turned off. If the determination is negative, the process returns to step 102, in which the foregoing process is repeated. When the determination in step 114 turns affirmative, the process proceeds to step 116, in which the CPU 14A turns off the headlights 12. After that, the CPU 14A ends the foregoing series of processes.

That is, in this embodiment, the light distribution control as in the first embodiment is performed only in the case where an obstacle that includes a pedestrian is detected. As a result of this, the road shape can be given priority in lighting, in usual cases. In the case where a pedestrian or an obstacle is detected and it is determined that there is an impediment characteristic to the travel of the vehicle, restraint of the vehicle speed is prompted, and recognition of the pedestrian or the like is given priority. Besides, since the light distribution control is performed according to the vehicle travel impediment characteristic, restraint of the vehicle speed will not be prompted more than necessary, and the achievement of both safety and comfort during rain becomes possible.

Incidentally, in the foregoing embodiments, the micromirrors 32s of the DMDs 30 are rotationally driven to control the radiation and non-radiation of light to each divided region. However, the control of the radiation and non-radiation of light to each divided region may also be carried out by using a plurality of LED light sources. In this case, it is possible to control the reduction and increase and the like of the light only to control-object divided regions 22, without changing the amount of light to the other divided regions 22.

As embodiments of the invention, headlights for vehicles may be used as vehicle lighting means. For example, each headlight may have a plurality of light sources, such as LED light sources or the like, and the headlight may be able to divide the light distribution region into a plurality of divided regions. Alternatively, the headlight may be able to divide the light from a light source by using spatial light modulation elements, such as DMDs (Digital Micromirror Devices), liquid crystal elements, etc. Furthermore, the headlight may be able to divide the light from a source by using a shutter or the like.

As detection means in the invention, for example, results of the picture taking of a camera, or the like may be used to detect light regions. Besides, regions that emit light, such as street lights and the like, may also be detected.

While some embodiments of the invention have been illustrated above, it is to be understood that the invention is not limited to details of the illustrated embodiments, but may be embodied with various changes, modifications or improvements, which may occur to those skilled in the art, without departing from the spirit and scope of the invention.

The invention claimed is:

1. A lighting method comprising:
lighting an outside of a vehicle;
detecting at least one white lane marker that reflects light on a road on which the vehicle travels;
determining a white lane marker that is apart from the vehicle by at least a predetermined distance, among the detected at least one white lane marker; and
causing light distribution to the determined white lane marker to be relatively darker than light distribution to another region in which the determined white lane marker does not exist on the road on which the vehicle travels;
wherein the predetermined distance includes a predetermined braking distance by which the vehicle travels from when a vehicle speed begins to decrease by a braking force applied to the vehicle until when the vehicle speed becomes zero.

2. A vehicle lighting device comprising:
a vehicle illuminator that changes light distribution characteristic separately for each of a plurality of divided regions of a light distribution region;
a detection device that detects at least one white lane marker that reflects light on a road on which the vehicle travels; and
a determination device for determining a white lane marker that is apart from the vehicle by at least a predetermined distance, among the at least one white lane marker detected by the detection device,
a control device that controls the vehicle illuminator so that the white lane marker determined by the determination device has a dark light distribution relative to another region in which the determined white lane marker does not exist on the road on which the vehicle travels; and
wherein the predetermined distance includes a predetermined braking distance by which the vehicle travels from when a vehicle speed begins to decrease by a braking force applied to the vehicle until when the vehicle speed becomes zero.

3. The vehicle lighting device according to claim 2, further comprising a determination device that determines presence/absence of a travel impediment to the vehicle;
wherein the control device executes a control of the vehicle illuminator if it is determined by the determination device that the travel impediment is present.

4. The vehicle lighting device according to claim 3, wherein the determination device determines that the travel impediment is present, if at least one travel impediment that is at least one of a pedestrian and an obstacle is detected.

5. The vehicle lighting device according to claim 2, wherein the vehicle illuminator changes the light distribution characteristic separately for each of a plurality of divided regions of the light distribution region.

6. The vehicle lighting device according to claim 2, wherein the vehicle illuminator is provided in a front end portion of the vehicle.

7. The vehicle lighting device according to claim 2, wherein the light distribution characteristic includes at least one of direction of light distribution and amount of light distribution.

8. The vehicle lighting device according to claim 2, wherein:
the vehicle illuminator has a spatial light modulation element; and
the control device controls the vehicle illuminator by driving the spatial light modulation element.

9. The vehicle lighting device according to claim 8, wherein:
the spatial light modulation element is a digital micromirror device that includes a plurality of micromirrors; and
the control device controls the vehicle illuminator by rotating at least one of the plurality of micromirrors.

10. The vehicle lighting device according to claim 2, wherein:
the vehicle illuminator has a plurality of light sources; and
the control device controls the vehicle illuminator by changing the amount of light distribution of at least one of the plurality of light sources.

11. A vehicle lighting device comprising:
a vehicle illuminator that changes light distribution characteristic separately for each of plurality of divided regions of a light distribution region;
a detection device that detects a white lane marker that reflects light on a road on which the vehicle travels;
a control device that controls the vehicle illuminator so that, in a light distribution region that is lighted by the vehicle illuminator, the light distribution to the white lane marker detected by the detection device becomes relatively darker than the light distribution to another region in which the white lane marker does not exist on the road on which the vehicle travels; and
rain determination device that determines whether or not it is raining,
wherein the control device prohibits a control of the vehicle illuminator, if it is determined by the rain determination device that it is raining.

12. The vehicle lighting device according to claim 11, wherein if it is determined by the rain determination device that it is raining, the control device controls the vehicle illuminator so that the white lane marker detected by the detection device has a bright light distribution relative to another region on the road on which the vehicle travels.

13. The vehicle lighting device according to claim 11, wherein the vehicle illuminator changes the light distribution characteristic separately for each of a plurality of divided regions of the light distribution region.

14. The vehicle lighting device according to claim 11, wherein the vehicle illuminator is provided in a front end portion of the vehicle.

15. The vehicle lighting device according to claim 11, wherein the light distribution characteristic includes at least one of direction of light distribution and amount of light distribution.

16. The vehicle lighting device according to claim 11, wherein;
the vehicle illuminator has a spatial light modulation element; and
the control device controls the vehicle illuminator by driving the spatial light modulation element.

17. The vehicle lighting device according to claim 16, wherein:
the spatial light modulation element is a digital micromirror device that includes a plurality of micromirrors; and
the control device controls the vehicle illuminator by rotating at least one of the plurality of micromirrors.

18. The vehicle lighting device according to claim 11, wherein:
the vehicle illuminator has a plurality of light sources; and
the control device controls the vehicle illuminator by changing the amount of light distribution of at least one of the plurality of light sources.

19. The vehicle lighting device according to claim 11, wherein the rain determination device determines whether or not it is raining, based on state of operation of a windshield wiper of the vehicle.

20. The vehicle lighting device according to claim 11, further comprising specific determination device for specifically determining the white lane marker that is apart from the vehicle by at least a predetermined distance, among the white lane marker detected by the detection device,
wherein the control device controls the vehicle illuminator so that the white lane marker specifically determined by the specific determination device has a dark light distribution relative to another region.

21. The vehicle lighting device according to claim 20, wherein the specific determination device specifically determines, as the white lane marker apart from the vehicle by at least the predetermined distance, the white lane marker that corresponds to a predetermined high-beam region in the light distribution region of the vehicle illuminator.

22. The vehicle lighting device according to claim 20, wherein the specific determination device specifically determines, as the white lane marker apart from the vehicle by at least the predetermined distance, the white lane marker that corresponds to a region that is apart from the vehicle by at least a braking distance that is determined beforehand.

23. The vehicle lighting device according to claim 11, further comprising a determination device that determines presence/absence of a travel impediment to the vehicle;
wherein the control device executes a control of the vehicle illuminator if it is determined by the determination device that the travel impediment is present.

24. The vehicle lighting device according to claim 23, wherein the determination device determines that the travel impediment is present, if at least one travel impediment that is at least one of a pedestrian and an obstacle is detected.

25. A lighting method comprising:
lighting an outside of a vehicle;
detecting a white lane marker that reflects light on a road on which the vehicle travels;
causing light distribution to the white lane marker in a light distribution region that is lighted to be relatively darker than the light distribution to another region in which the white lane marker does not exist on the road on which the vehicle travels;
determining whether or not it is raining; and
prohibiting a control of the lighting the outside of the vehicle, if it is determined that it is raining.

26. The lighting method according to claim 1, wherein a reflectance of the determined white lane marker is substantially higher than a reflectance of another region in which the determined white lane marker does not exist on the road on which the vehicle travels.

27. The lighting method according to claim 1, wherein the braking distance varies depending on the vehicle speed.

28. The vehicle lighting device according to claim 2, wherein a reflectance of the determined white lane marker is substantially higher than a reflectance of another region in which the determined white lane maker does not exist on the road on which the vehicle travels.

29. The vehicle lighting device according to claim 2, wherein the braking distance varies depending on the vehicle speed.

* * * * *